(12) United States Patent
Nakajima et al.

(10) Patent No.: US 10,541,830 B2
(45) Date of Patent: Jan. 21, 2020

(54) SERIAL COMMUNICATION SYSTEM

(71) Applicant: Mitsubishi Electric Corporation, Tokyo (JP)

(72) Inventors: Masahiro Nakajima, Tokyo (JP); Katsuyuki Sumimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 70 days.

(21) Appl. No.: 15/888,138

(22) Filed: Feb. 5, 2018

(65) Prior Publication Data

US 2019/0165968 A1    May 30, 2019

(30) Foreign Application Priority Data

Nov. 27, 2017    (JP) .................................. 2017-226561

(51) Int. Cl.
    H04L 12/40    (2006.01)
(52) U.S. Cl.
    CPC .... H04L 12/40 (2013.01); *H04L 2012/40215* (2013.01); *H04L 2012/40234* (2013.01)
(58) Field of Classification Search
    CPC ........... H04L 12/40; H04L 2012/40215; H04L 2012/40234
    See application file for complete search history.

(56) References Cited

U.S. PATENT DOCUMENTS

| 5,109,543 A * | 4/1992 | Dissosway ............ H04L 1/0078 455/170.1 |
| 9,432,298 B1 * | 8/2016 | Smith .................. H04L 49/9057 |
| 2016/0078458 A1 * | 3/2016 | Gold .................. G06Q 30/0201 705/7.32 |
| 2016/0099927 A1 * | 4/2016 | Oz .......................... H04L 63/08 726/9 |
| 2017/0300432 A1 * | 10/2017 | Kitamura ................ G06F 13/16 |

FOREIGN PATENT DOCUMENTS

| JP | 07-202864 A | 8/1995 |
| JP | 2005-191910 A | 7/2005 |
| JP | 2011-103581 A | 5/2011 |

* cited by examiner

*Primary Examiner* — Kashif Siddiqui
(74) *Attorney, Agent, or Firm* — Sughrue Mion, PLLC; Richard C. Turner (57) ABSTRACT

Among serial communication systems between vehicle-mounted communication units, a serial communication system for improving use efficiency of a communication bandwidth in a communication standard LIN has been required. In order to solve this problem, in a serial communication system of LIN, a response of a master node as a write request transmitted from the master node to a slave node and a response of the slave node transmitted from the slave node to the master node are combined into a time base, and a certain period for receiving a response from the slave node is provided after the write request from the master node.

11 Claims, 9 Drawing Sheets

SERIAL COMMUNICATION SYSTEM

BACKGROUND OF THE INVENTION

Field of the Invention

The present invention relates to a serial communication system between vehicle-mounted communication units, and more particularly to a serial communication system using a communication protocol "LIN (Local Interconnect Network)".

Background Art

CAN (Controller Area Network) is adopted as a multiplex communication protocol for controlling on-vehicle electronic control parts. Among these control targets, LIN is adopted for control of sensors and actuators that does not require communication speed and reliability required for power train control for controlling an engine or the like and chassis control for controlling steering or the like. For example, LIN is especially adopted for control of functional areas of comfort such as door mirror, power seat, sunroof, door lock, air conditioner and lighting. Especially, LIN has a narrower communication bandwidth (up to 20 Kbps) than that of CAN, but has an advantage that it can be implemented at low cost, and is used in many vehicle devices.

LIN protocol performs simple transmission data protection (parity, checksum) in a master/slave system (one master and multiple slaves). LIN nodes include a microcontroller (microcomputer) and a LIN transceiver. LIN performs transmission and reception using a serial communication apparatus "UART (Universal Asynchronous Receiver Transmitter)" equipped with many microcomputers in order to connect the sensors and the actuators inexpensively.

Various proposals have been made on the LIN communication system. For example, Patent Document 1 proposes to reduce communication leakage without deteriorating communication efficiency. Patent Document 2 proposes a highly reliable system which does not generate an erroneous output even when a communication error or a malfunction occurs. Patent Document 3 proposes to efficiently perform communication of each communication unit by equalizing communication load of CPU (Central Processing Unit) of a master unit and slave units.

Patent Document 1: JP-A-2011-103581
Patent Document 2: JP-A-07-202864
Patent Document 3: JP-A-2005-191910

However, the proposal of Patent Document 1 is a technique for improving use efficiency by preferentially transmitting data having a high update frequency without transmitting data having a low update frequency, and there is a problem that the master needs to read the slave according to time base as before for error determination. The proposal of Patent Document 2 is based on communication that does not have a concept of time base like LIN, and there is a problem that it cannot be directly applied to LIN. The proposal of Patent Document 3 can improve use efficiency of communication by enabling data transfer between the slaves, but there is a problem that all the master and the slaves need to be compatible.

SUMMARY OF THE INVENTION

An object of the present invention is to solve the above-mentioned problems and to provide a serial communication system for improving use efficiency of a communication bandwidth in a communication standard LIN among serial communication systems between vehicle-mounted communication units.

A serial communication system of the present invention is a serial communication system of LIN, wherein a response of a master node as a write request transmitted from the master node to a slave node and a response of the slave node transmitted from the slave node to the master node are combined in a time base.

The foregoing and other object, features, aspects, and advantages of the present invention will become more apparent form the following detailed description of the present invention when taken in conjunction with the accompanying drawings.

According to the present invention, it is possible to maintain merits of LIN and to improve use efficiency of a communication bandwidth in a normal state.

That is, different LIN communication addresses are conventionally assigned for a frame in which the master node transmits a header and a response and a frame in which the slave node receives the response. Therefore, a user has been asked for management checks in order to avoid that the new address overlaps used addresses, however, the present invention reduces the management checks.

In the LIN communication protocol, version 1.3 can assign one master task and 16 types of communication addresses, and version 2.X (X is an arbitrary number determined according to the standard) can assign one master task and 64 types of communication addresses, but assigning 4 types or 6 types of communication addresses to one type of slave is an actual usage method. For example, in a case where four kinds of communication addresses are assigned to all the slaves, it is a situation that only four kinds of slaves can participate in LIN communication network in version 1.3, and it is inefficient that a second master task must be provided.

Therefore, the present invention can not only improve time efficiency of communication but also reduce or overcome such a physical problem by reducing assignment amount of address.

DETAILED DESCRIPTION OF THE PREFERRED EMBODIMENTS

Embodiment 1

Figure 1:
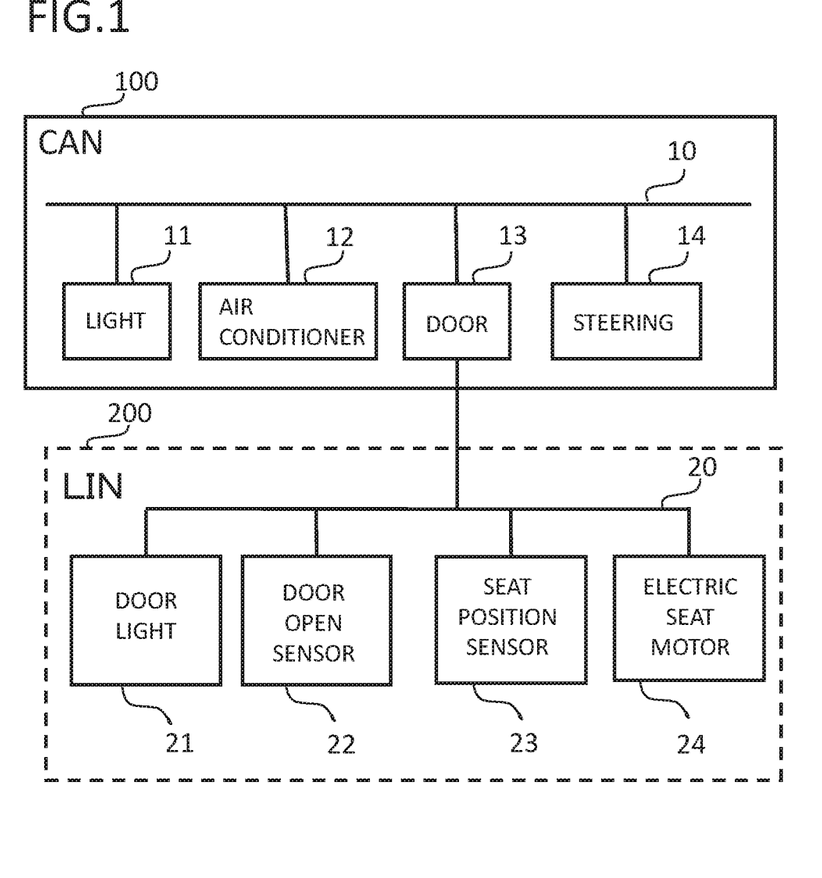
FIG. 1 is a configuration diagram showing a configuration of a network system to which the present invention is applied.

As shown in FIG. 1, a network system to which a serial communication system according to the present invention is applied is a LIN 200 constructing a subnetwork system for a CAN 100 which performs control requiring high reliability. The CAN 100 is used for controlling important units such as a light 11, an air conditioner 12, a door 13, and a steering 14, which are connected to a CAN bus 10 in electronic control of an automobile. On the other hand, the LIN 200 is used for controlling sensors, actuators and the like, while the door 13 and a plurality of units such as a door light 21, a door open sensor 22, a seat position sensor 23 and an electric seat motor 24, which need to be controlled in relation to a movement of the door 13, are connected to a LIN bus 20.

LIN communication is performed in "master/slave system" and "communication based on schedule", and transmission is performed according to transmission timing defined in advance. Therefore, no collision of messages occurs, and each node can reliably transmit and receive messages at regular intervals. However, the fact that the transmission timing is determined means that each node cannot transmit a message at an arbitrary timing, and it is necessary to wait until the transmission timing comes. Further, since a node playing a special role of "controlling transmission timing" is required in the LIN network, the communication is performed using two types of nodes called a master node and a slave node.

LIN network structure is a line type bus structure, and one master node and a plurality of slave nodes can be connected to one LIN bus 20. The LIN network employs a master/slave system in which the master node controls the whole communication, and the slave nodes communicate according to the master node.

There are two types of roles of master task and slave task in LIN nodes, and the master task is a role only the master node has, and transmits a token and manages the schedule. This means that a transmission request is transmitted to the LIN bus at a predetermined timing. The slave task is a role both the master node and the slave node have, and is responsible for transmitting data.

Figure 2:
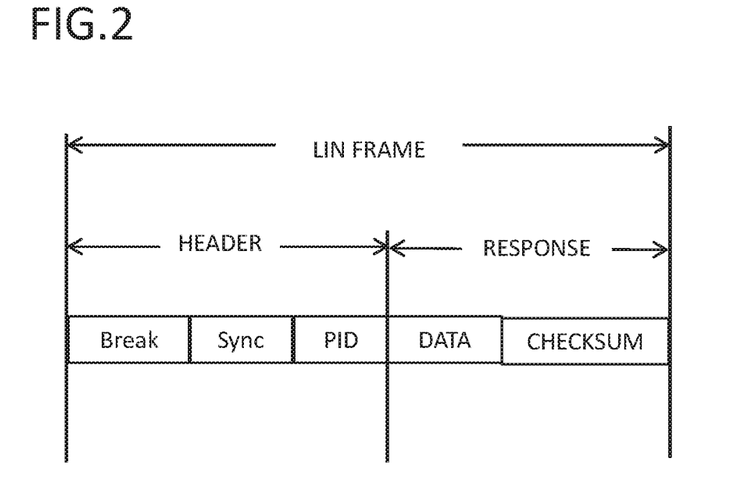
FIG. 2 is an explanatory diagram showing a structure of a frame of LIN which is an object of the present invention.

In data transmission, the slave task monitors the token transmitted from the master task, and the node transmitting the data transmits the data and a checksum after the token. In LIN, the token is called "header", the data and checksum are called "response", and the message is called "frame". Therefore, a structure of a LIN frame has a header and a response as shown in FIG. 2.

The header is composed of three fields of "Break", "Sync" and "PID". "Break" notifies all the slave nodes of start of the LIN frame. "Sync" is a synchronization signal for correcting clock error, and "PID" is Protected ID.

The response is composed of two fields of "data" and "checksum", the data is stored in the data field, and the checksum is used to confirm whether the data can have been correctly received.

Figure 3:
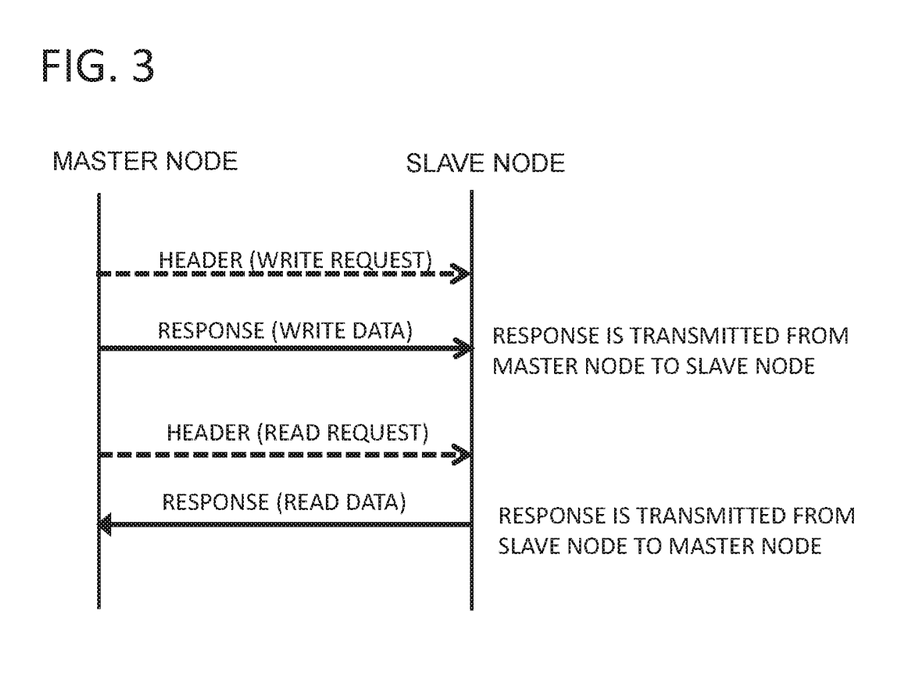
FIG. 3 is an explanatory diagram showing a data communication state between nodes of LIN which is the object of the present invention.

As shown in FIG. 3, in data communication between the LIN nodes, the header is sent from the master node to the slave nodes, and the slave node instructed to transmit data among the slave nodes transmits a response to the master node. In the case of write (writing), the response is transmitted from the master node to the slave node, and in the case of read (reading), the response is transmitted from the slave node.

Figure 4:
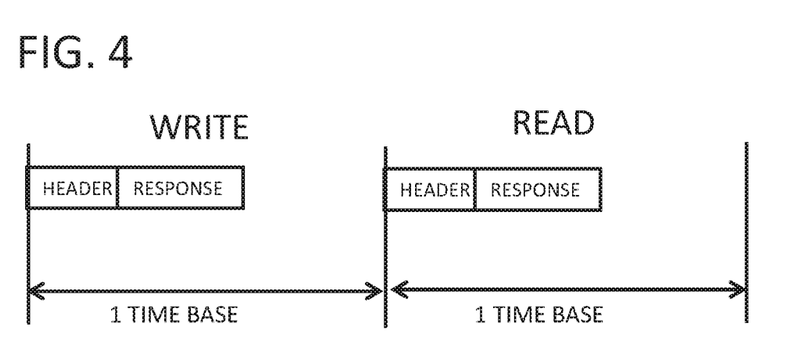
FIG. 4 is an explanatory diagram showing a communication cycle of LIN which is the object of the present invention.

The LIN communication is performed on a frame-by-frame basis, and as shown in FIG. 4, one communication is performed in a communication cycle called Time Base.

Figure 5:
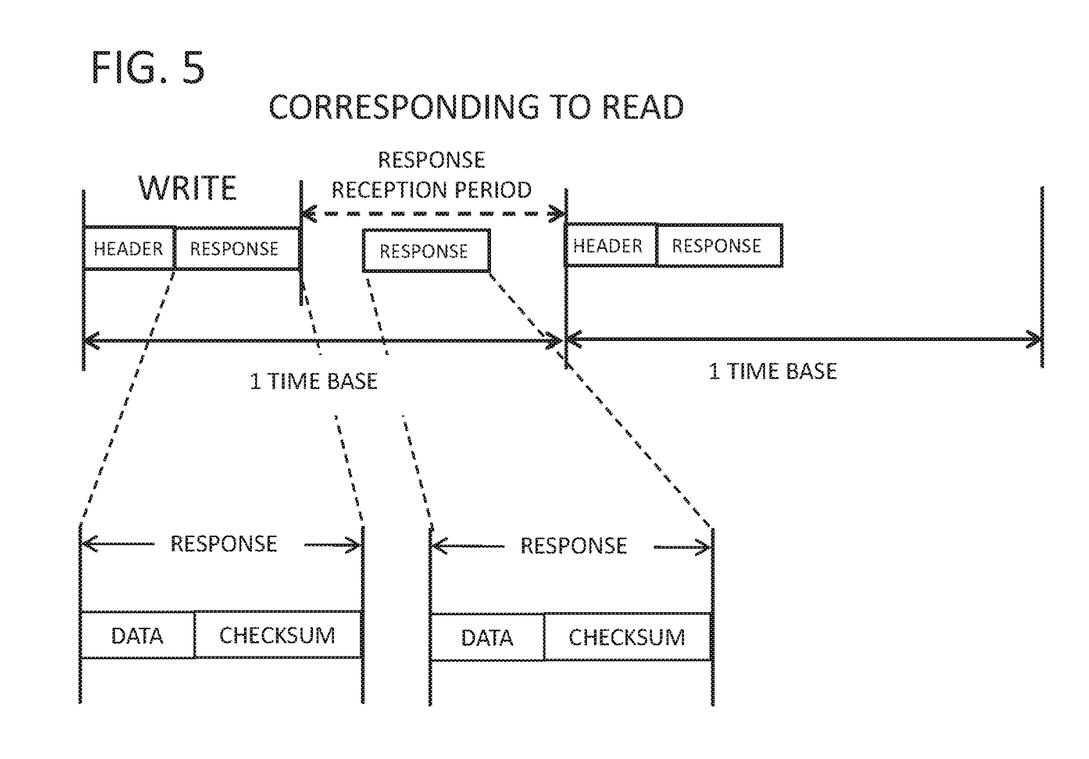
FIG. 5 is an explanatory diagram showing a schedule of LIN according to an embodiment 1 of the present invention.

In the embodiment 1, as shown in FIG. 5, a certain period for receiving a response from the slave node is provided after a write request from the master node in a time base, and the slave node transmits a response in the time base after receiving the write request. That is, the response (data and checksum) of the master node and the response (data and checksum) of the slave node are combined in a time base. In this manner, use efficiency of a communication bandwidth can be improved by providing a response reception period in a time base.

The LIN communication protocol is implemented in UART, and the master node is controlled by MPU (Micro Processor Unit). Therefore, it is possible to accept the response from the slave node in the same time base in which the write request has been transmitted, by changing software control for the master node.

A communication control flow of the master node will be described with reference to a flowchart of FIG. 6.

Figure 6:
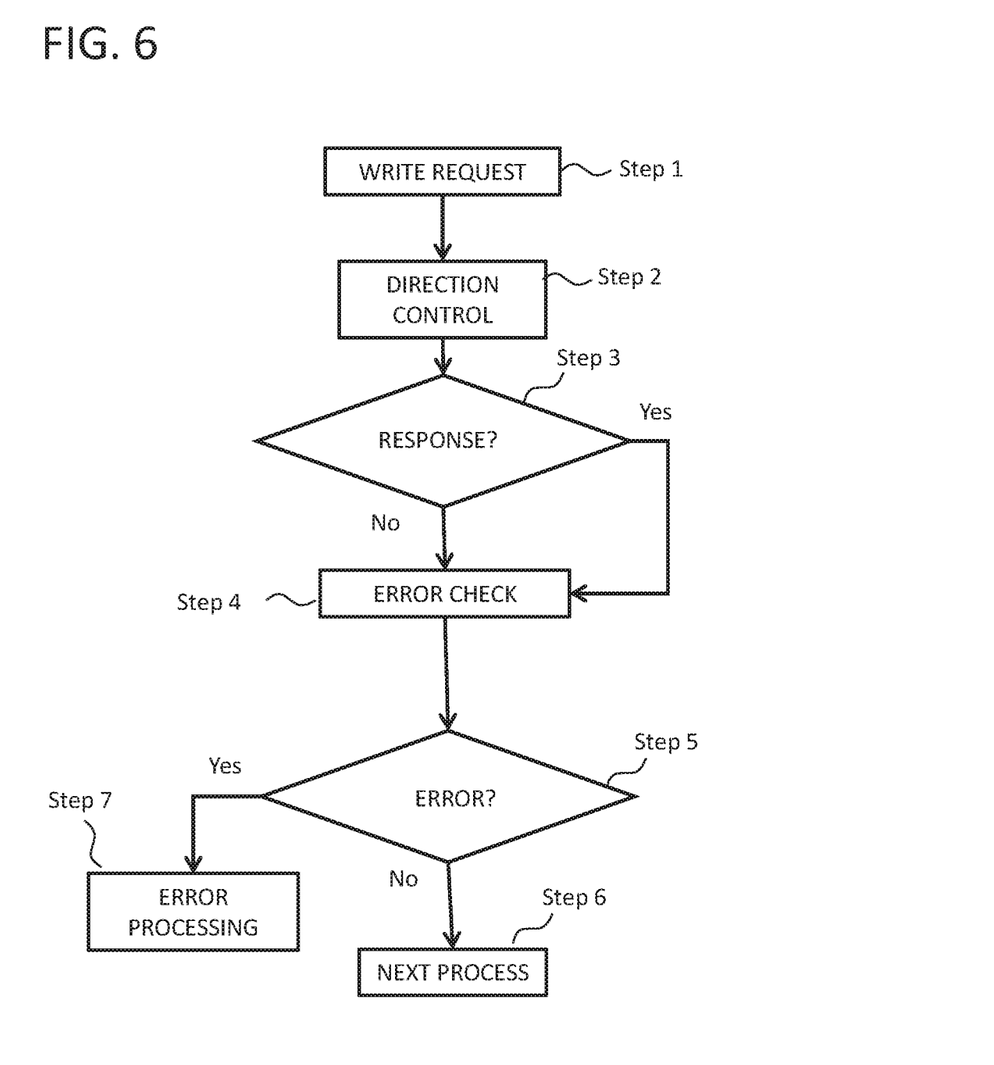
FIG. 6 is a flowchart showing a communication control flow of a master based on LIN communication according to the embodiment 1 of the present invention.

As shown in FIG. 6, in the master node, the write request is transmitted in Step 1, and then direction control of the UART node is performed, to wait for a response from the slave node in Step 2. It is determined whether the response from the slave node has been received after transmitting the write request in Step 3, and when the response is received, an error check is performed as to whether the write request has been normally received or abnormally received from information included in the received response in Step 4.

In Step 5, it is determined whether there is an error, and when it is confirmed that the write request is normally received, a next process is started in Step 6. When it is confirmed that the write request is abnormally received, an error processing is started in Step 7. When there is no response during the response reception period after the write request, since it is in the same state as a conventional slave node, it cannot be determined whether the write request has been normally received or abnormally received. Therefore, in this case, a read request for determining whether the write request is normally received or abnormally received is transmitted in the next time base in order to make the determination as in the conventional case.

On the other hand, the slave node determines whether the write request is for itself, and when the write request is not for itself, the request is ignored as in the conventional LIN. When it is determined that the write request is for itself and the checksum is correct, the slave node transmits a response to the master node. This response includes information that can identify whether the write request from the master node has been normally received or abnormally received and a checksum. When the checksum in the write request is incorrect, the received data is discarded and a response to the master node is not transmitted according to the LIN protocol.

In addition to this information, status information indicating a status of the slave node and a checksum may be included as long as remaining time of the time base is allowed. Thus, by including the status information, it is possible to omit read information for checking the status, thereby further improving communication efficiency. The remaining time of the time base can be obtained from an amount of communication data and communication speed of the master node and the slave node. That is, the response reception period provided in a time base is obtained from the amount of communication data and the communication speed of the master node and the slave node.

Embodiment 2

In the embodiment 1, it has been described that, in a serial communication system of LIN, after the write request of the master node, the master node is made receivable, and a certain period for receiving the response from the slave node is provided in a time base. The slave node transmits the response in a time base after receiving the write request, the master node performs processing according to a status of the received response, and when there is remaining time in the time base, the status information is included in the response to be transmitted by the slave node.

In the embodiment 2, a case where the status information is too long (much) to be at once fitted to the remaining time of a time base will be described.

Figure 7:
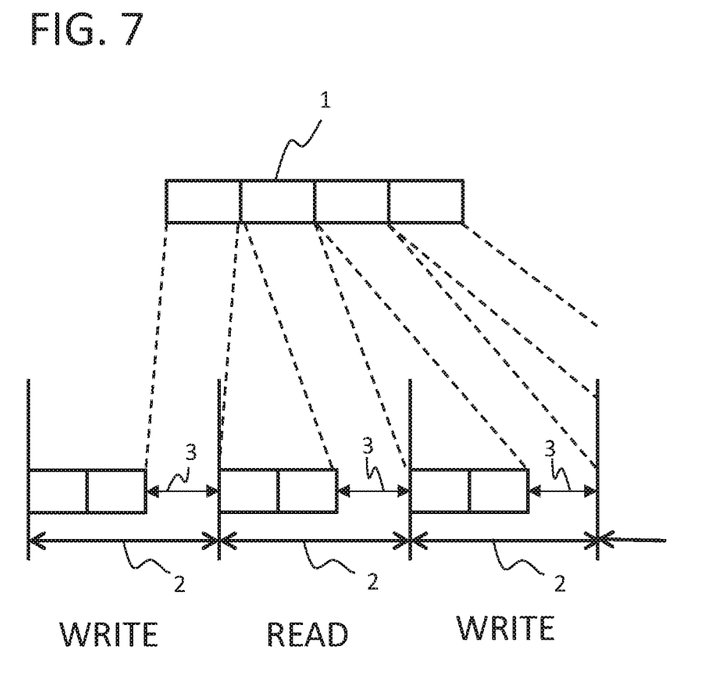
FIG. 7 is an explanatory diagram showing a communication state of status information according to an embodiment 2 of the present invention.

As shown in FIG. 7, the transmission from the slave node and the processing by the master node will be described with respect to a case where status information 1 to be included in the response sent back from the slave node is longer than remaining time 3 of a time base 2.

The slave node divides the status information 1 to be transmitted into a plurality of pieces in accordance with the remaining time 3 of a time base 2 and transmits it in the remaining time 3 of the time base 2. By dividing and transmitting the status information in this manner, the master node can recognize a series of status information by combining the divided information.

Figure 8:
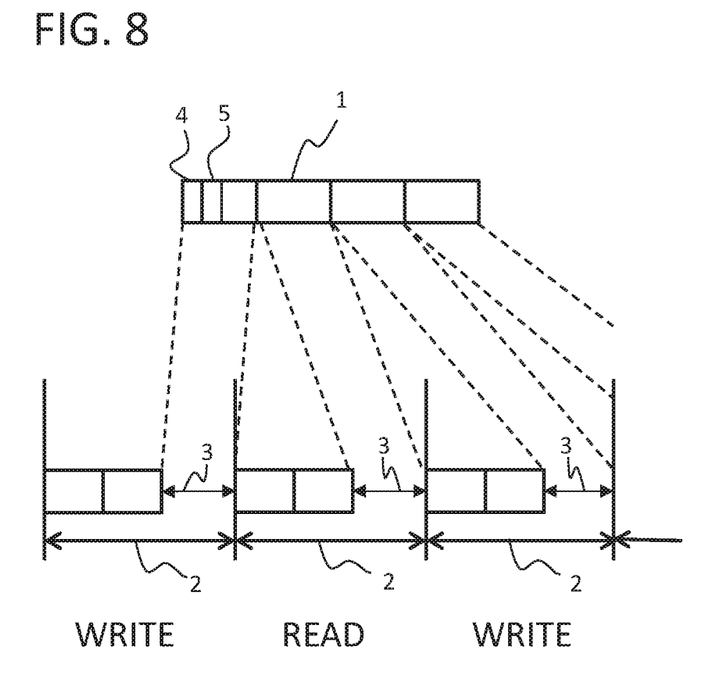
FIG. 8 is an explanatory diagram showing a communication state of status information according to the embodiment 2 of the present invention.

When the slave node divides the status information 1 into a plurality of pieces in accordance with the remaining time 3 of a time base 2 and transmits it, as shown in FIG. 8, the slave node transmits a first response including a counter value 4 corresponding to the number of divisions of the status information 1 and key information 5 for restoring the status information corresponding to the counter value 4. The master node receives the response from the slave node and confirms to have normally received the response, and thus the master node can recognize in advance a status of a series of status information based on the counter value 4 and the key information 5 for restoration included in the response before receiving complete status information divided and transmitted.

Embodiment 3

When an unrecoverable abnormality occurs in a communication path, the write request from the master node is abnormally received in the slave node.

The slave node counts the number of abnormality detections upon abnormally receiving the write request, and transmits the response including the number of abnormality detections up to this point. As described in the embodiment 1, this response is transmitted from the slave node in the response reception period after the write request from the master node.

Figure 9:
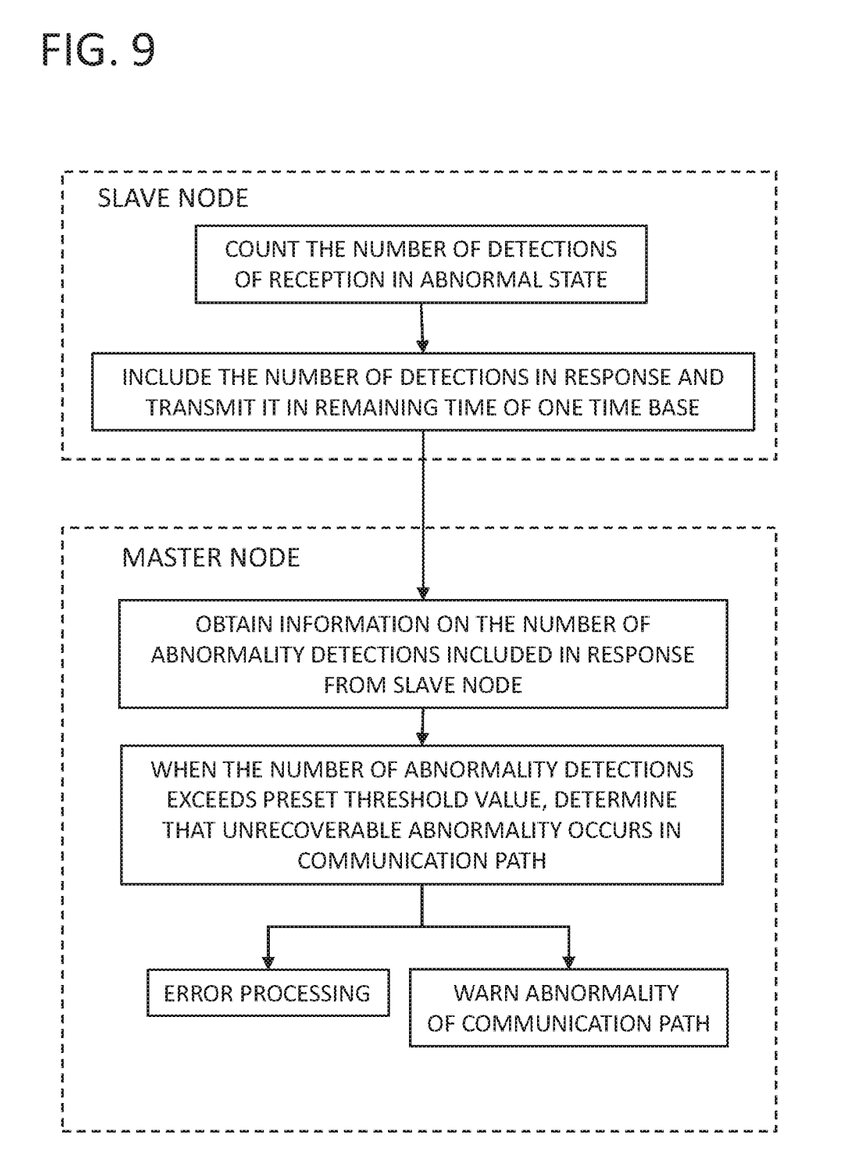
FIG. 9 is an explanatory diagram showing a process according to an embodiment 3 of the present invention.

That is, as shown in FIG. 9, the slave node counts the number of detections of reception in an abnormal state, and includes the number of detections in the response to transmit it in the remaining time of a time base. Then, the master node obtains information on the number of abnormality detections included in the response from the slave node, and when the number of abnormality detections exceeds a preset threshold value, the master node determines that an unrecoverable abnormality occurs in the communication path, and performs error processing to warn the abnormality of the communication path. Since this series of processing is performed based on the information included in the response transmitted from the slave node in a time base of the write request from the master node, there is an effect that it is possible to not only improve the communication efficiency but also to quickly deal with the abnormality of the communication path.

Although the embodiments of the present invention have been described above, the present invention is not limited to the embodiments, and various changes can be made, and modifications and omissions of the embodiments can be appropriately made. It is also possible to combine contents described as embodiments to implement the invention. Various modifications and alterations of this invention will be apparent to those skilled in the art without departing from the scope and spirit of this invention, and it should be understood that this is not limited to the illustrative embodiments set forth herein.

What is claimed is:

1. A serial communication system of a Local Interconnect Network (LIN), the serial communication system comprising:
a master node connected to a bus; and
a slave node connected to the bus,
wherein a response of the master node as a write request transmitted from the master node to the slave node and a response of the slave node transmitted from the slave node to the master node are combined in a time base, and
the slave node includes, in the response, status information indicating a status of the slave node when a length of the status information is within a remaining time in the time base, and, when the status information is longer than the remaining time in the time base, the slave node includes, in the response, a portion of the status information that is sized in accordance with the remaining time.

2. The serial communication system according to claim 1, wherein a certain period for receiving a response from the slave node is provided after the write request from the master node, and
the slave node transmits the response in the time base after receiving the write request.

3. The serial communication system according to claim 2, wherein the master node remains in a reception mode in the certain period and performs processing according to a state of the response received from the slave node.

4. The serial communication system according to claim 1, wherein when the status information is longer than the remaining time in the time base, the slave node divides the status information into a plurality of pieces in accordance with the remaining time, and transmits the status information distributed in a plurality of time bases, the portion of the status information being one of the plurality of pieces transmitted in the time base among the plurality of time bases.

5. The serial communication system according to claim 4, wherein the response of the slave node is a first response of a plurality of responses transmitted by the slave node in the plurality of time bases, and
the slave node includes and transmits a counter value corresponding to a number of divisions of the status information divided into the plurality of pieces and key information for restoring the status information corresponding to the counter value in the first response.

6. A serial communication system of a Local Interconnect Network (LIN), the serial communication system comprising:
a master node connected to a bus; and
a slave node connected to the bus,
wherein a response of the master node as a write request transmitted from the master node to the slave node and a response of the slave node transmitted from the slave node to the master node are combined in a time base,
a certain period for receiving a response from the slave node after the write request is provided,
the master node remains in a reception mode in the certain period and performs processing according to a state of the response received from the slave node, and
when the slave node abnormally receives the write request, the slave node transmits a response including a number of abnormality detections, and when the number of abnormality detections exceeds a preset threshold value, the master node determines that an irrecoverable abnormality occurs in a communication path.

7. A serial communication system of a Local Interconnect Network (LIN), the serial communication system comprising:
a master node connected to a bus; and
a slave node connected to the bus,
wherein a response of the master node as a write request transmitted from the master node to the slave node and a response of the slave node transmitted from the slave node to the master node are combined in a time base, and
when the master node receives the response from the slave node, the master node checks whether the write request is normally received or abnormally received, to proceed to a next process when the write request is normally received, and to proceed to an error processing when the write request is abnormally received, and when the master node receives no response, the master node issues a read request to determine whether the response is normal or abnormal in a next time base.

8. The serial communication system according to claim 7, wherein the slave node includes, in the response, status information indicating a status of the slave node and transmits the response in the time base.

9. The serial communication system according to claim 8, wherein when the status information is longer than a remaining time in the time base, the slave node divides the status information into a plurality of pieces in accordance with the remaining time, and transmits the status information distributed in a plurality of time bases, the time base being one of the plurality of time bases.

10. The serial communication system according to claim 9, wherein the response of the slave node is a first response of a plurality of responses transmitted by the slave node in the plurality of time bases, and
the slave node includes and transmits a counter value corresponding to the number of divisions of the status information divided into the plurality of pieces and key information for restoring the status information corresponding to the counter value in the first response.

11. The serial communication system according to claim 7, wherein when the slave node abnormally receives the write request, the slave node transmits a response including a number of abnormality detections, and when the number of abnormality detections exceeds a preset threshold value, the master node determines that an irrecoverable abnormality occurs in a communication path.

* * * * *